US008191750B2

(12) United States Patent
Park

(10) Patent No.: US 8,191,750 B2
(45) Date of Patent: Jun. 5, 2012

(54) APPARATUS FOR CUTTING A LIQUID CRYSTAL DISPLAY PANEL AND METHOD THEREOF

(75) Inventor: Young-Kuk Park, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 529 days.

(21) Appl. No.: 10/944,870

(22) Filed: Sep. 21, 2004

(65) Prior Publication Data

US 2005/0061123 A1 Mar. 24, 2005

(30) Foreign Application Priority Data

Sep. 24, 2003 (KR) ........................ 10-2003-0066270

(51) Int. Cl.
*C03B 33/033* (2006.01)

(52) U.S. Cl. .............................. 225/97; 225/2; 225/96.5

(58) Field of Classification Search .................. 225/1–5, 225/93, 94–97, 103; 83/404, 407, 408; 347/187
See application file for complete search history.

(56) References Cited

U.S. PATENT DOCUMENTS

| | | | | |
|---|---|---|---|---|
| 1,930,582 A * | 10/1933 | Burdett et al. | 225/96.5 |
| 2,793,471 A * | 5/1957 | Kurata et al. | 225/96.5 |
| 2,948,991 A * | 8/1960 | Walters et al. | 225/96.5 |
| 3,044,216 A * | 7/1962 | Billinger | 225/96.5 |
| 3,175,745 A * | 3/1965 | Insolio | 225/96.5 |
| 3,190,518 A * | 6/1965 | Insolio | 225/96.5 |
| 3,279,664 A * | 10/1966 | Lynch | 225/96.5 |
| 3,286,893 A * | 11/1966 | Zellers, Jr. | 225/2 |
| 3,486,673 A * | 12/1969 | Madge | 225/2 |
| 4,454,972 A * | 6/1984 | Maltby et al. | 225/96.5 |
| 4,948,025 A * | 8/1990 | Lisec | 225/104 |
| 5,350,228 A * | 9/1994 | Remington | 312/223.1 |
| 5,691,037 A * | 11/1997 | McCutcheon et al. | 428/172 |
| 5,857,603 A * | 1/1999 | Lisec | 225/2 |
| 6,576,149 B1 | 6/2003 | Matsuzawa | |
| 2003/0151717 A1 | 8/2003 | Shin | |
| 2003/0168055 A1 | 9/2003 | Chae | |
| 2004/0074366 A1 | 4/2004 | Choo et al. | |

FOREIGN PATENT DOCUMENTS

| | | |
|---|---|---|
| CN | 1436642 | 8/2003 |
| JP | 07-138039 | 5/1995 |
| JP | 2003/119043 | 4/2003 |
| KR | 10-2003-0067998 | 8/2003 |
| KR | 10-2003-0073272 | 9/2003 |

* cited by examiner

*Primary Examiner* — Edward Landrum
(74) *Attorney, Agent, or Firm* — McKenna, Long, and Aldrige, LLP.

(57) ABSTRACT

An apparatus and method for cutting a LCD panel is provided. The apparatus comprises a first scribing unit for forming first scribing lines and second scribing lines for dividing LCD panels on a substrate having a plurality of LCD panels. The apparatus also has a first flipping unit for flipping the substrate, a first breaking unit having a breaking bar for striking the flipped substrate along the first scribing lines to form a crack on the substrate, and a plurality of breaking rollers for pressing the flipped substrate along the second scribing lines to form a crack on the substrate. A breaking process of an LCD panel may be performed without rotating the substrate by using the breaking bar and the breaking rollers. Also, the breaking process may be performed without damaging image display regions of LCD panels where different sized LCD panels are on the substrate.

8 Claims, 20 Drawing Sheets

APPARATUS FOR CUTTING A LIQUID CRYSTAL DISPLAY PANEL AND METHOD THEREOF

This application claims the benefit of Korean Patent Application No. 2003-66270, filed in Korea on Sep. 24, 2003, which is hereby incorporated by reference for all purposes as if fully set forth herein.

BACKGROUND OF THE INVENTION

1. Field of the Invention

The present invention relates to an apparatus for cutting a liquid crystal display panel and a method thereof, and more particularly, to an apparatus and method for cutting a liquid crystal display panel that individually cuts liquid crystal display panels formed on a large glass substrate into unit liquid crystal display panels.

2. Description of the Related Art

In general, a liquid crystal display device displays a desired image by individually supplying a data signal, according to image information, to liquid crystal cells arranged in a matrix form and controlling light transmittance of the liquid crystal cells.

To improve yield in fabricating a liquid crystal display device, a plurality of thin film transistor array substrates are formed on one large mother substrate, and a plurality of color filter substrates are formed on another mother substrate. The two mother substrates are then attached thereby simultaneously forming a plurality of liquid crystal display panels. Thus, a process for cutting the liquid crystal panel into a plurality of unit panels is required.

The liquid crystal display panels formed on the large mother substrate are cut into a plurality of unit panels by first performing a scribing process where a scribing line on a surface of the mother substrate is formed with a wheel having a hardness higher than that of glass. A breaking process is then performed in which the LCD panels are cut by applying a mechanical force along the scribing line.

The apparatus for cutting a liquid crystal panel and method thereof will now be described in detail with reference to the accompanying drawings.

FIG. 1 is a schematic plan view illustrating a unit liquid crystal display panel formed with a thin film transistor array substrate and a color filter substrate 2 attached to face into each other in accordance with the related art.

In FIG. 1, the liquid crystal display panel 10 includes an image display unit 13 having a plurality of liquid crystal cells arranged in a matrix. A gate pad unit 14 connects to a plurality of gate lines of the image display unit 13. In addition, a data pad unit 15 connects to a plurality of data lines.

The gate pad unit 14 and the data pad unit 15 are formed at a marginal portion of a thin film transistor array substrate 1. The gate pad unit 14 on thin film transistor array substrate does not overlap the color filter substrate 2. The gate pad unit 14 supplies a scan signal supplied from a gate driver integrated circuit to the gate lines of the image display unit 13. The data pad unit 15 supplies image information supplied from a data driver integrated circuit to the data lines of the image display unit 13.

The data lines receiving the image information and the gate lines receiving the scan signal are disposed such that the data lines and the gate lines orthogonally cross on the thin film transistor array substrate 1 of the image display unit 13. At the crossed portion, a thin film transistor is formed for switching the liquid crystal cells, and a pixel electrode is formed that connects to the thin film transistor for driving the liquid crystal cell. Further, a passivation layer is formed on the entire surface to protect the electrode and the thin film transistor.

At the color filter substrate 2 of the image display unit 13, a plurality of color filters are separated into regions by a black matrix. In addition, a common transparent electrode corresponding to the pixel electrode is formed on the thin film transistor array substrate 1.

A cell gap is formed between the thin film transistor array substrate 1 and the color filter substrate 2 so that the two substrates are spaced apart and face each other. The thin film transistor array substrate 1 and the color filter substrate 2 are attached by a sealant (not shown) formed at the exterior of the image display unit 13. A liquid crystal layer (not shown) is formed at the space between the thin film transistor array substrate 1 and the color filter substrate 2.

FIG. 2 is a cross-sectional view showing a plurality of unit liquid crystal display panels formed in the first mother substrate having the thin film transistor array substrate and the second mother substrate with the color filter substrate in accordance with the related art.

As illustrated in FIG. 2, a plurality of unit panels are formed in such a manner that one side of the thin film transistor array substrate 1 protrudes beyond the edge of the corresponding color filter substrate 2. This protrusion of the thin film transistor array substrate corresponds to dummy region 21 of the color filter substrate 2. This occurs because the gate pad unit 14 and the data pad unit 15 are formed at the marginal portion where the thin film transistor array substrate 1 and the color filter substrate 2 do not overlap, i.e., the extend portion of the thin film transistor array substrate.

Thus, the color filter substrate 2 formed on the second mother substrate 30 is isolated from an area on the thin film transistor array substrate 1 formed on the first mother substrate 20 that corresponds to the color filter substrate 2 by the amount the dummy regions 21 protrude.

Each unit panel is disposed at the first and second mother substrates 20 and 30 such that space on the first and the second mother substrates 20 and 30 is maximized. Depending on the model, the unit panels are generally formed to be isolated by an amount corresponding to a dummy region 22.

After the first mother substrate 20 having the thin film transistor array substrates 1 is attached to the second mother substrate 30 having the color filter substrates 2, the liquid crystal display panels are individually cut using both the scribing process and the breaking process. The dummy regions 21 formed where the color filter substrates 2 of the second mother substrate 30 are isolated are removed. The dummy regions 22 isolating the unit panels are simultaneously removed.

The process of cutting the unit panels will now be described with reference to FIGS. 3A to 3H.

As illustrated in FIG. 3A, first scribing lines 31 for dividing the plurality of liquid crystal display panels 10 in a first direction are sequentially formed as the mother substrate 20 having the plurality of liquid crystal display panels 10 moves in one direction.

Next, as illustrated in FIG. 3B, the mother substrate 20 rotates 90°. While the mother substrate 20 moves back to its original position, second scribing lines 32 for dividing the plurality of liquid crystal display panels 10 in a second direction are sequentially formed.

As illustrated in FIG. 3C, the mother substrate 20 is flipped and struck by a breaking bar 40 by moving the mother substrate 20 in one direction. As such, a crack is formed on the mother substrate 20 along the second scribing line 32.

Next, as illustrated in FIG. 3D, the mother substrate 20 rotates 90° and is struck by the breaking bar 40 by moving the mother substrate 20 back to its original position. Thus, a crack is formed on the mother substrate 20 along the first scribing line 31.

As illustrated in FIG. 3E, while the mother substrate 20 is moved in one direction, third scribing lines 33 that divide the plurality of liquid crystal display panels 10 in a first direction are sequentially formed.

Next, as illustrated in FIG. 3F, the mother substrate 20 rotates by 90°. Then, as the mother substrate 20 moves back to its original position, fourth scribing lines 34 for dividing the plurality of liquid crystal display panels 10 in a second direction are sequentially formed.

As illustrated in FIG. 3G, the mother substrate 20 is flipped over and struck by a breaking bar 41 by moving the mother substrate 20 to its original position. Thus, a crack is formed on the mother substrate 20 along the fourth scribing line 34.

As illustrated in FIG. 3H, the mother substrate 20 is rotated by 90° and is struck by the breaking bar 41 by moving the mother substrate 20 to its original position such that a crack is formed on the mother substrate 20 along the third scribing line 33.

In a related art cutting apparatus and method for forming a unit LCD panel, a scribing process and a breaking process are done four times while performing four rotation processes and two flipping processes.

Thus, two scribing units that include a rotating unit and two breaking units that include a rotating unit and a flipping unit are required. This equipment occupies a great amount of space in the fabrication line. Thus, installation expenses and space occupied by the equipment increase.

In addition, this related art apparatus and method increases the time associated with the scribing and breaking processes, thereby resulting in low productivity.

A related art method for simultaneously fabricating LCD panels having different sizes on a mother substrate will be explained in more detail as follows.

For example, when single size LCD panels are fabricated on a mother substrate, a region where the LCD panels are not fabricated is discarded thereby wasting an unused portion of the mother substrate.

Therefore, LCD panels having a smaller size than the single size LCD panels are fabricated on regions of the mother substrate where the single size LCD panels are not fabricated. This method utilizes the space on a mother substrate, thereby increasing efficiency.

However, in the related art cutting apparatus and method for forming the unit LCD panel, a breaking process cannot be performed where a mother substrate includes LCD panels having different sizes.

The related art cutting apparatus and method for cutting the unit LCD panel will be explained with reference to the attached drawings in more detail.

FIGS. 4A to 4H are related art views sequentially showing a cutting method of a unit LCD panel with a cutting apparatus where LCD panels of different sizes are fabricated on one mother substrate.

As illustrated in FIG. 4A, while a mother substrate 100 having LCD panels 110 of a first size and LCD panels 120 of a second size moves in one direction, first scribing lines 131 for dividing the LCD panels 110 of the first size and the LCD panels 120 of the second size in a first direction are sequentially formed.

Afterwards, as illustrated in FIG. 4B, the mother substrate 100 is rotated by 90°. Then, while the mother substrate 100 moves back to its original position, second scribing lines 132 for dividing the plurality of liquid crystal display panels 110 of the first size and the LCD panels 120 of the second size in a second direction are sequentially formed.

As illustrated in FIG. 4C, the mother substrate 100 is flipped over and moved in one direction. The mother substrate 100 is struck by a breaking bar 140 such that a crack is formed on the mother substrate 100 along the second scribing line 132.

However, in the process, image display regions of the LCD panels 110 of the first size are damaged by the breaking bar 140 thereby creating an inferior product.

As illustrated in FIG. 4D, the mother substrate 100 is rotated by 90° and struck by the breaking bar 140 while moving the mother substrate 100 to its original position. As such, a crack is formed on the mother substrate 100 along the first scribing line 131.

As illustrated in FIG. 4E, while the mother substrate 100 moves in one direction, third scribing lines 133 for dividing the LCD panels 110 of the first size and the LCD panels 120 of the second size in a first direction are sequentially formed.

As illustrated in FIG. 4F, the mother substrate 100 rotates by 90°. Then, while the mother substrate 100 moves back to its original position, fourth scribing lines 134 for dividing the plurality of liquid crystal display panels 110 of the first size and the LCD panels 120 of the second size in a second direction are sequentially formed.

As illustrated in FIG. 4G, the mother substrate 100 is flipped over and moved in one direction. The mother substrate 100 is struck by a breaking bar 141 such that a crack is formed on the mother substrate 100 along the fourth scribing line 134.

However, in this process, image display regions of the LCD panels 110 of the first size are damaged by the breaking bar 141 thereby creating an inferior product.

As illustrated in FIG. 4H, the mother substrate 100 is rotated by 90° and struck by the breaking bar 141 by moving the mother substrate 100 to its original position. Thus a crack is formed on the mother substrate 100 along the third scribing line 133.

As aforementioned, in this related art cutting apparatus and method, a scribing process and a breaking process are done four times while performing four rotation processes and two turning processes. Thus, two scribing units that include a rotating unit and two breaking units that include a rotating unit and a flipping unit are required. This equipment occupies a great amount of space in the fabrication line. As such, installation expenses and space occupied by the equipment increase.

In addition, additional time is required for the scribing and breaking processes, thereby decreasing productivity.

Furthermore, in a related art cutting apparatus and method for a unit LCD panel, a breaking process cannot be easily performed where LCD panels having different sizes are fabricated on a mother substrate.

SUMMARY OF THE INVENTION

Accordingly, the present invention is directed to apparatus for cutting a liquid crystal display panel and method thereof that substantially obviates one or more of the problems due to limitations and disadvantages of the related art.

Therefore, an advantage of the present invention is to provide an apparatus for cutting an LCD panel and a method thereof capable of reducing times associated with both a scribing process and a breaking process and minimizing both installation costs and space by simplifying a scribing unit and a breaking unit.

Another advantage of the present invention is to provide an apparatus for cutting an LCD panel and a method which performs a breaking process on a mother substrate having different sized LCD panels.

To achieve these and other advantages and in accordance with the purpose of the present invention, as embodied and broadly described herein, there is provided an apparatus for cutting an LCD panel comprising: a first scribing unit for forming first scribing lines in a first direction and second scribing lines in a second direction for dividing LCD panels on a mother substrate where a plurality of LCD panels are formed; a first flipping unit for flipping the mother substrate; and a first breaking unit having a breaking bar for striking the flipped mother substrate along the first scribing lines in the first direction so that a crack can be formed on the mother substrate, and having a plurality of breaking rollers for pressing the flipped mother substrate along the second scribing lines in the second direction so that a crack can be formed on the mother substrate.

In another aspect of the present invention, an apparatus for cutting an LCD panel comprises: a first scribing unit for forming first scribing lines in a first direction and second scribing lines in a second direction for dividing LCD panels on a mother substrate where a plurality of LCD panels are formed; a first flipping unit for flipping the mother substrate; a first breaking unit having a breaking bar for striking the flipped mother substrate along the first scribing lines in the first direction so that a crack can be formed on the mother substrate, and having a plurality of breaking rollers for pressing the flipped mother substrate along the second scribing lines in the second direction so that a crack can be formed on the mother substrate; a second scribing unit for forming third scribing lines that divide the plurality of LCD panels in the first direction on the flipped mother substrate, rotating the mother substrate, and then forming fourth scribing lines that divide the LCD panels in the second direction on the mother substrate; a second flipping unit for re-flipping the flipped mother substrate; and a second breaking unit having a breaking bar for striking the flipped mother substrate along the third scribing lines so that a crack can be formed on the mother substrate, and having a plurality of breaking rollers for pressing the flipped mother substrate along the fourth scribing lines so that a crack can be formed on the mother substrate.

To achieve these and other advantages and in accordance with the purpose of the present invention, as embodied and broadly described herein, there is also provided a method for cutting an LCD panel comprising: forming first scribing lines in a first direction on a mother substrate where a plurality of LCD panels are formed; rotating the mother substrate, and then forming second scribing lines in a second direction; flipping the mother substrate; striking the flipped mother substrate along the first scribing lines in the first direction so that a crack can be formed on the mother substrate; pressing the flipped mother substrate along the second scribing lines in the second direction so that a crack can be formed on the mother substrate; forming third scribing lines in the first direction on the flipped mother substrate; rotating the flipped mother substrate, and then forming fourth scribing lines in the second direction; re-flipping the flipped mother substrate; striking the mother substrate along the third scribing lines of a first direction so that a crack can be formed on the mother substrate; and pressing the mother substrate along the fourth scribing lines in the second direction so that a crack can be formed on the mother substrate.

In another aspect of the present invention, a method for cutting an LCD panel comprises: forming first scribing lines in a first direction on a mother substrate where a plurality of LCD panels are formed, and then rotating the mother substrate one time; forming second scribing lines in a second direction on the mother substrate, and then rotating the mother substrate two times; flipping the mother substrate; striking the flipped mother substrate along the first scribing lines in the first direction so that a crack can be formed on the mother substrate; pressing the flipped mother substrate along the second scribing lines in the second direction so that a crack can be formed on the mother substrate; forming third scribing lines in the first direction on the flipped mother substrate, and then rotating the mother substrate one time; forming fourth scribing lines in the second direction on the mother substrate, and then rotating the mother substrate two times; re-flipping the flipped mother substrate; striking the mother substrate along the third scribing lines in the first direction so that a crack can be formed thereon; and pressing the mother substrate along the fourth scribing lines in the second direction so that a crack can be formed thereon.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Hereinafter, an apparatus for cutting a liquid crystal display panel and a method thereof according to the present invention will be explained with reference to the attached drawings as follows.

Figure 1:
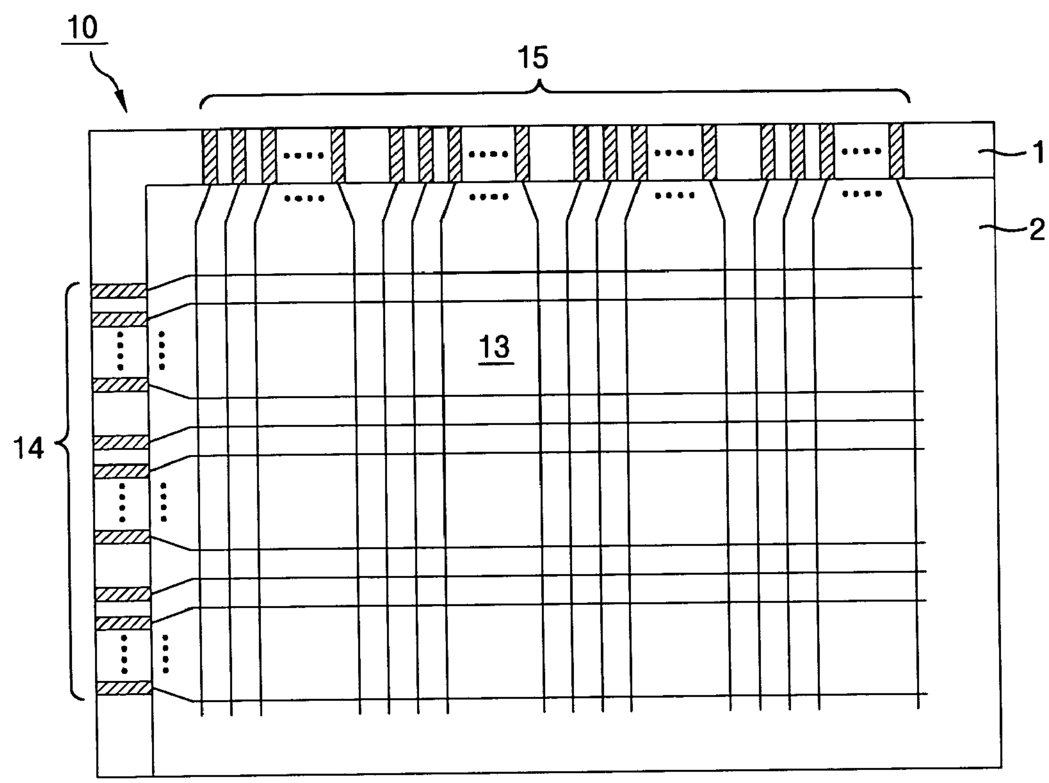
FIG. 1 is a plan view illustrating a unit liquid crystal display panel formed in a thin film transistor array substrate and a color filter substrate for a liquid crystal display device, which are attached to face into each other in accordance with the related art.
Figure 2:
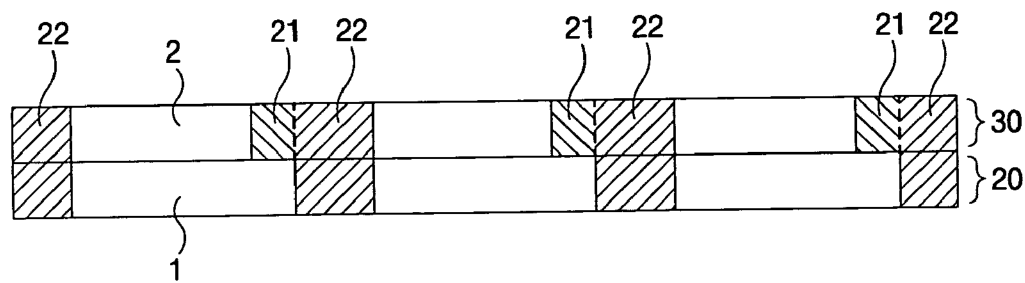
FIG. 2 is a related art cross-sectional view illustrating a plurality of liquid crystal display panels formed in a first mother substrate including the thin film transistor array substrates and a second mother substrate with the color filter substrate of FIG. 1.
Figure 3A:
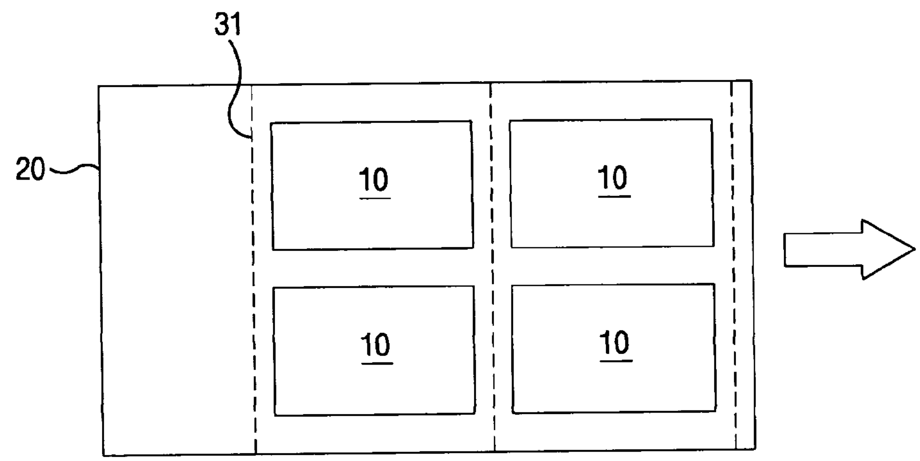
FIGS. 3A to 3H illustrate sequential cutting processes of unit panels in accordance with the related art.
Figure 3B:
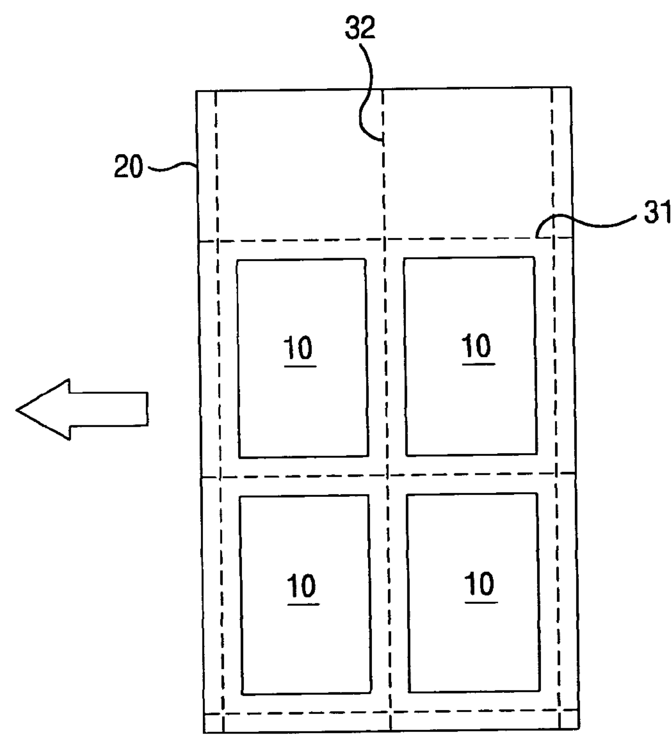
Figure 3C:
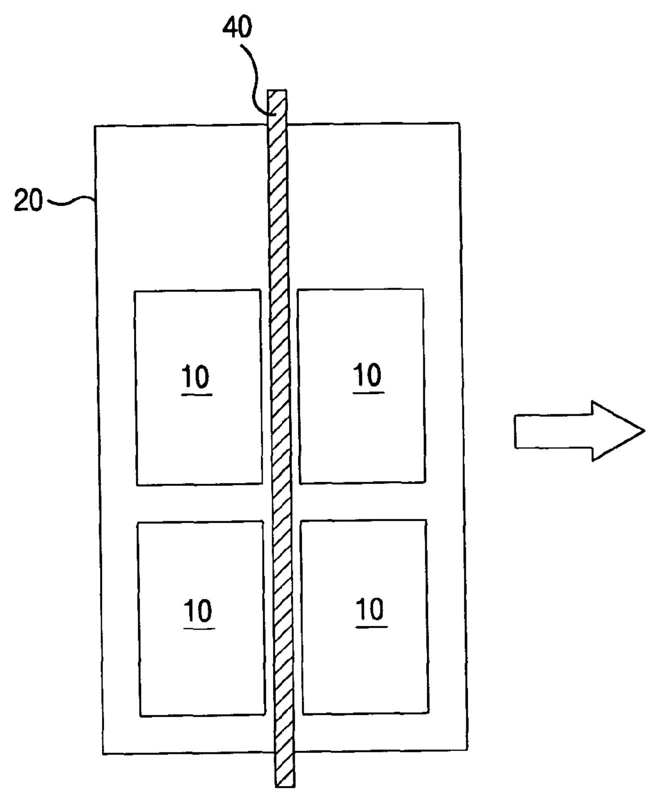
Figure 3D:
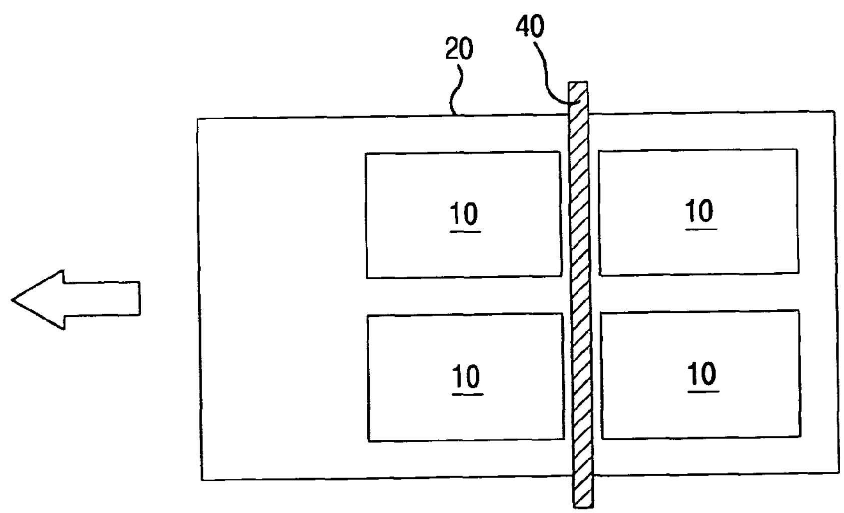
Figure 3E:
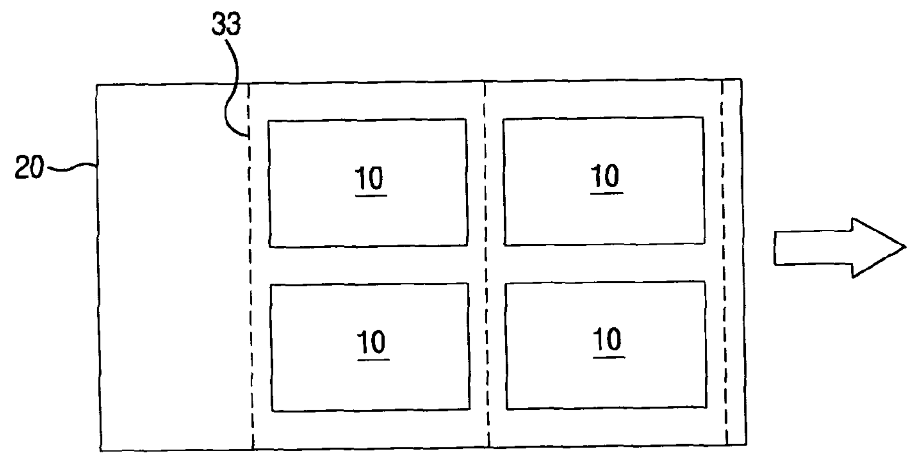
Figure 3F:
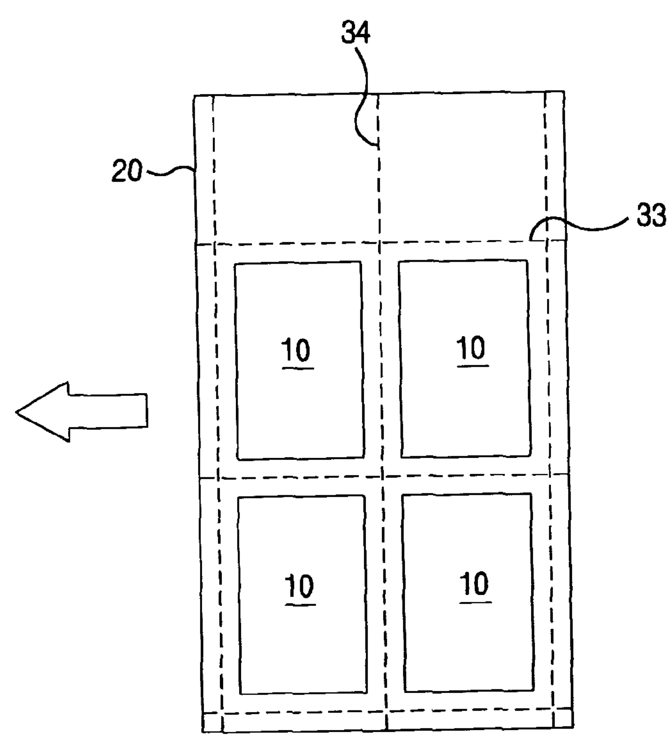
Figure 3G:
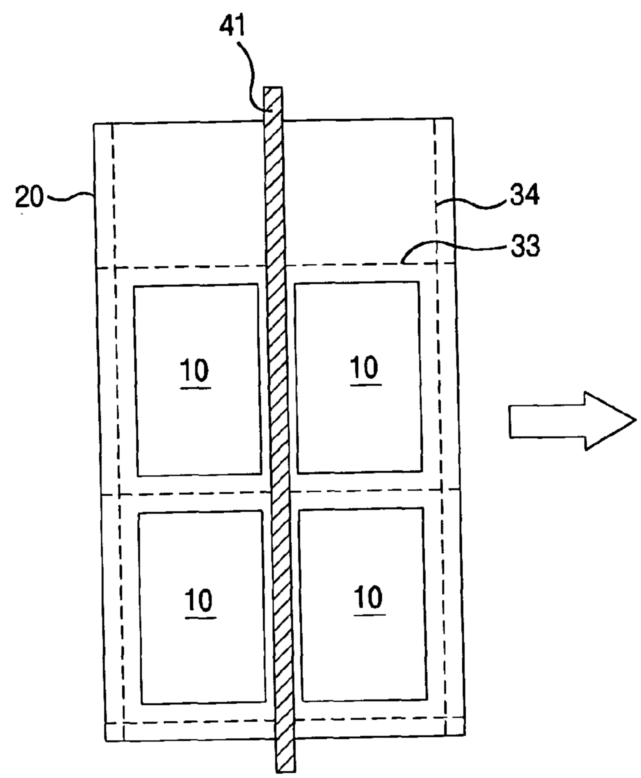
Figure 3H:
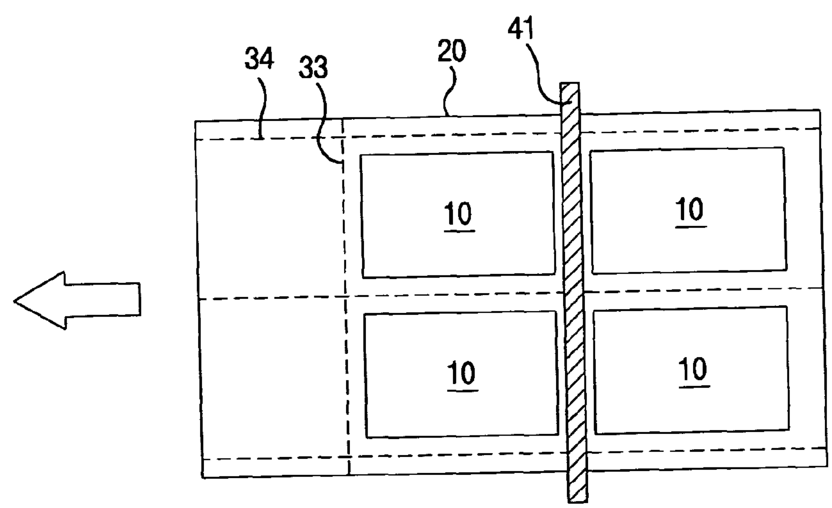
Figure 4A:
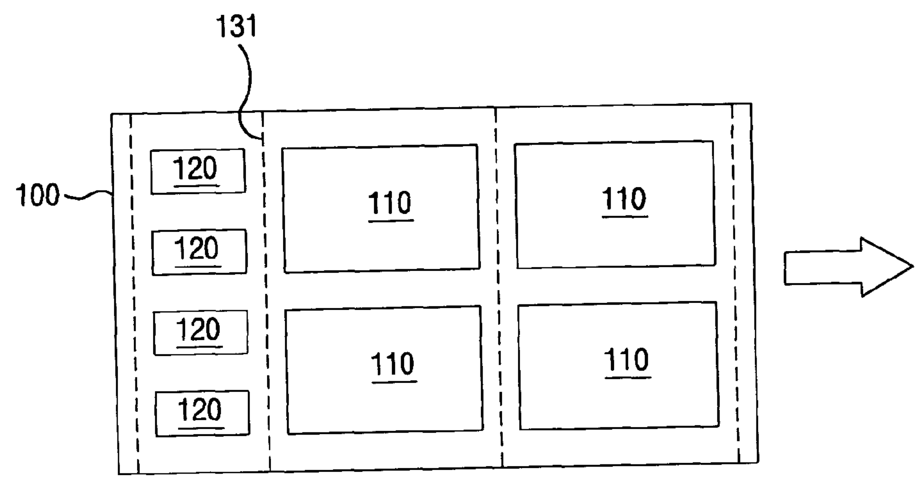
FIGS. 4A to 4H are views sequentially illustrating a method for cutting a liquid crystal display panel by a cutting apparatus where LCD panels having different sizes are fabricated on one mother substrate in accordance with the related art.
Figure 4B:
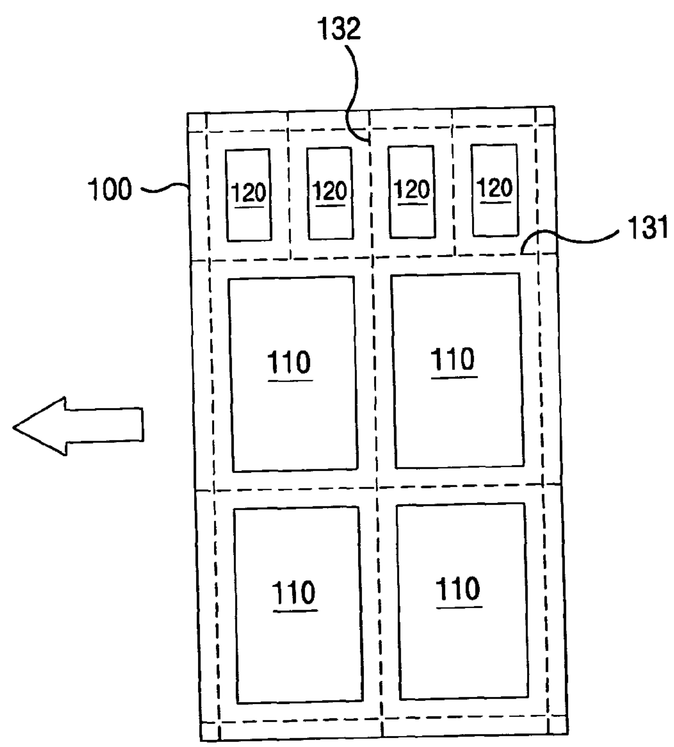
Figure 4C:
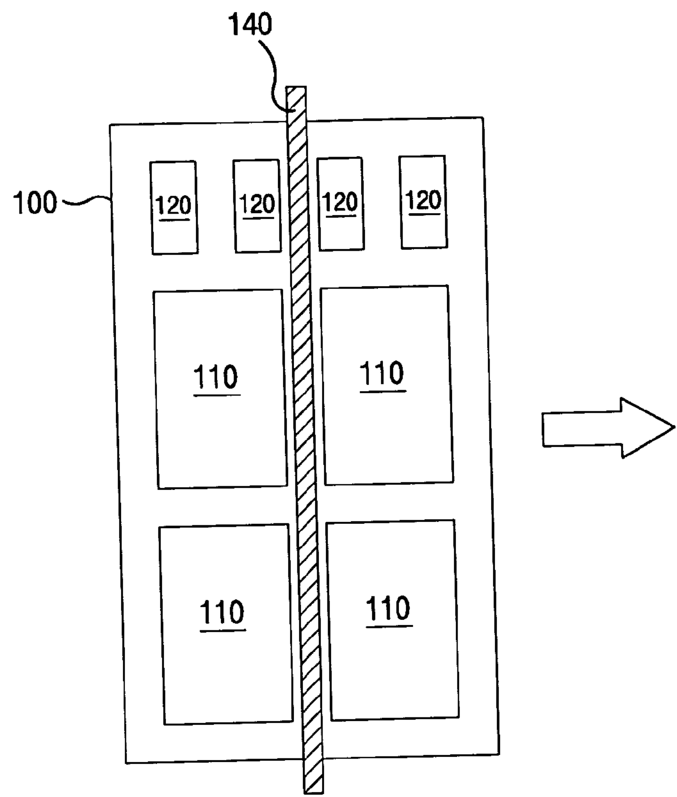
Figure 4D:
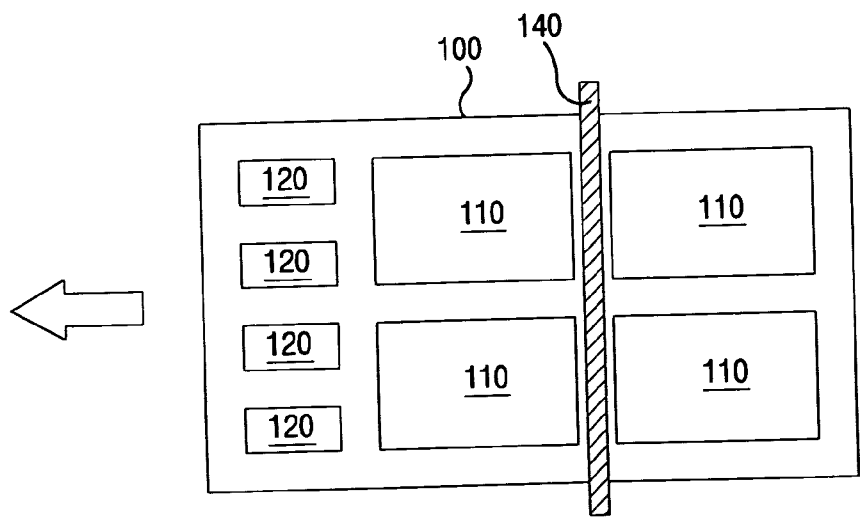
Figure 4E:
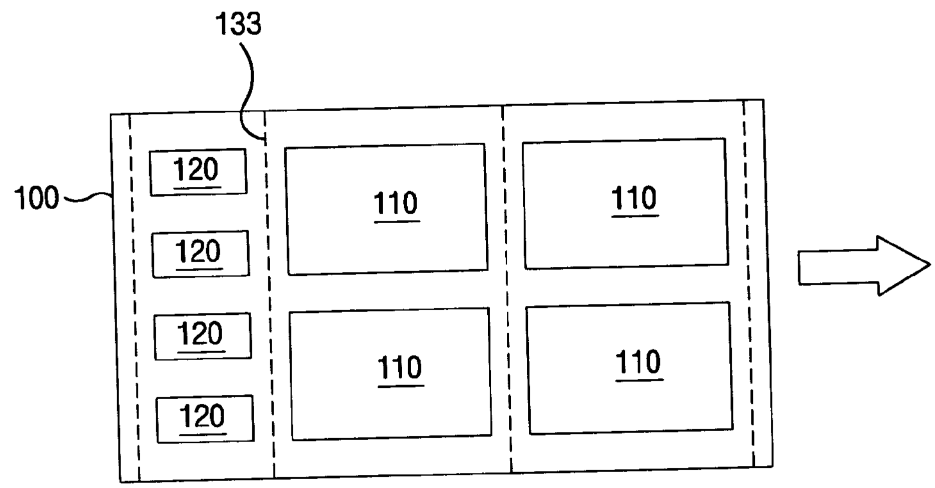
Figure 4F:
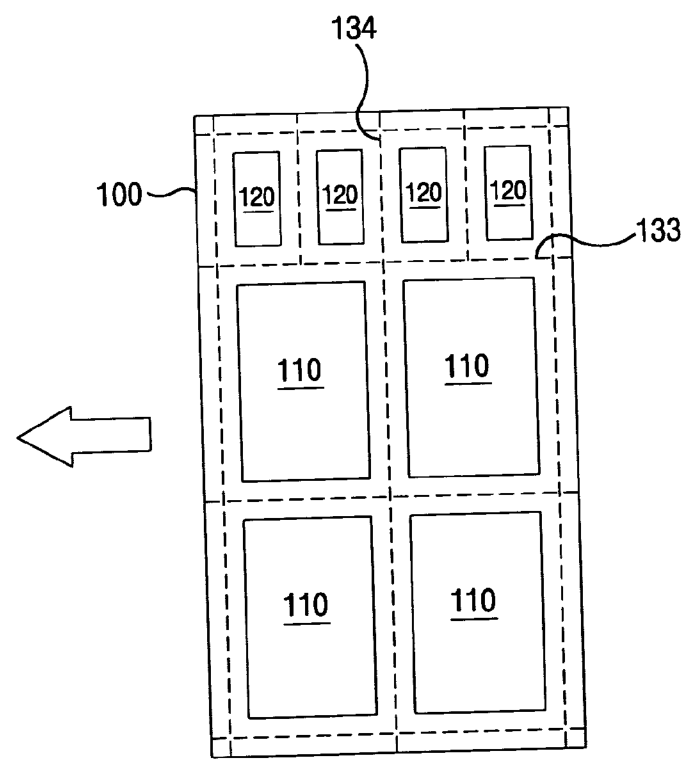
Figure 4G:
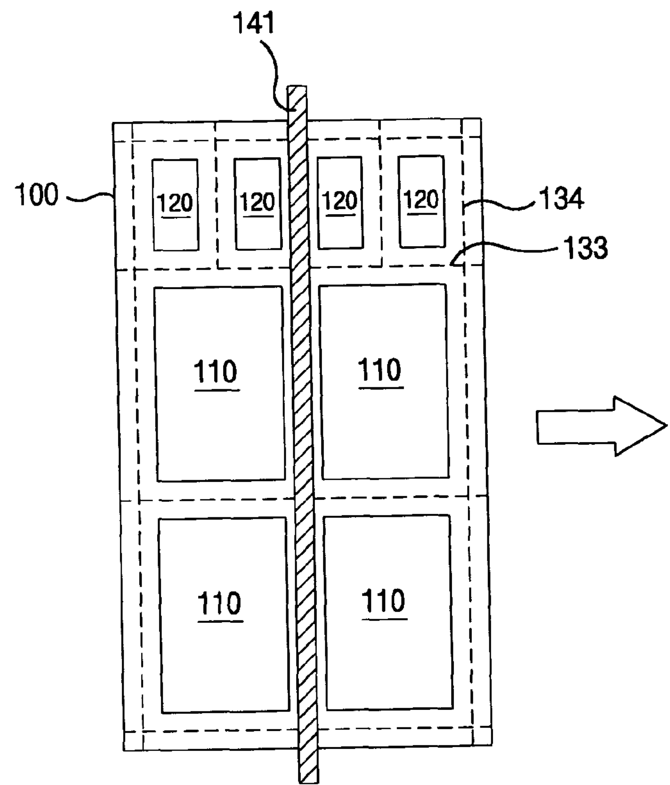
Figure 4H:
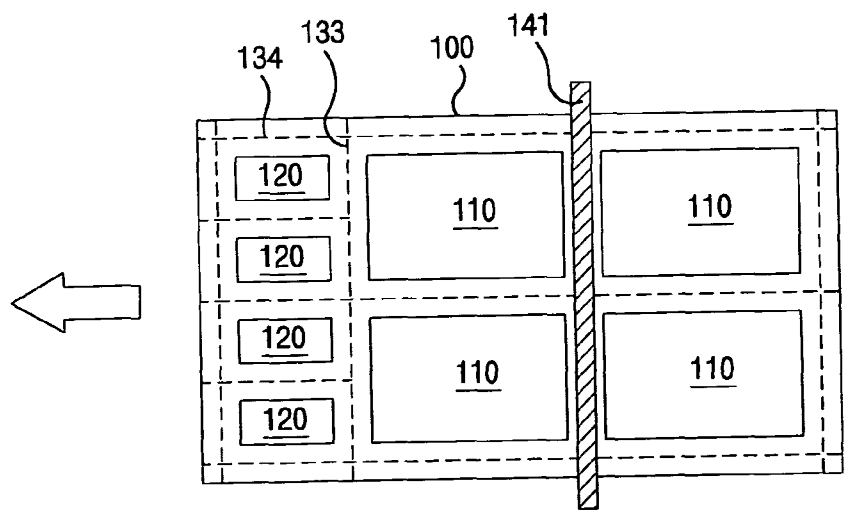
Figure 5:
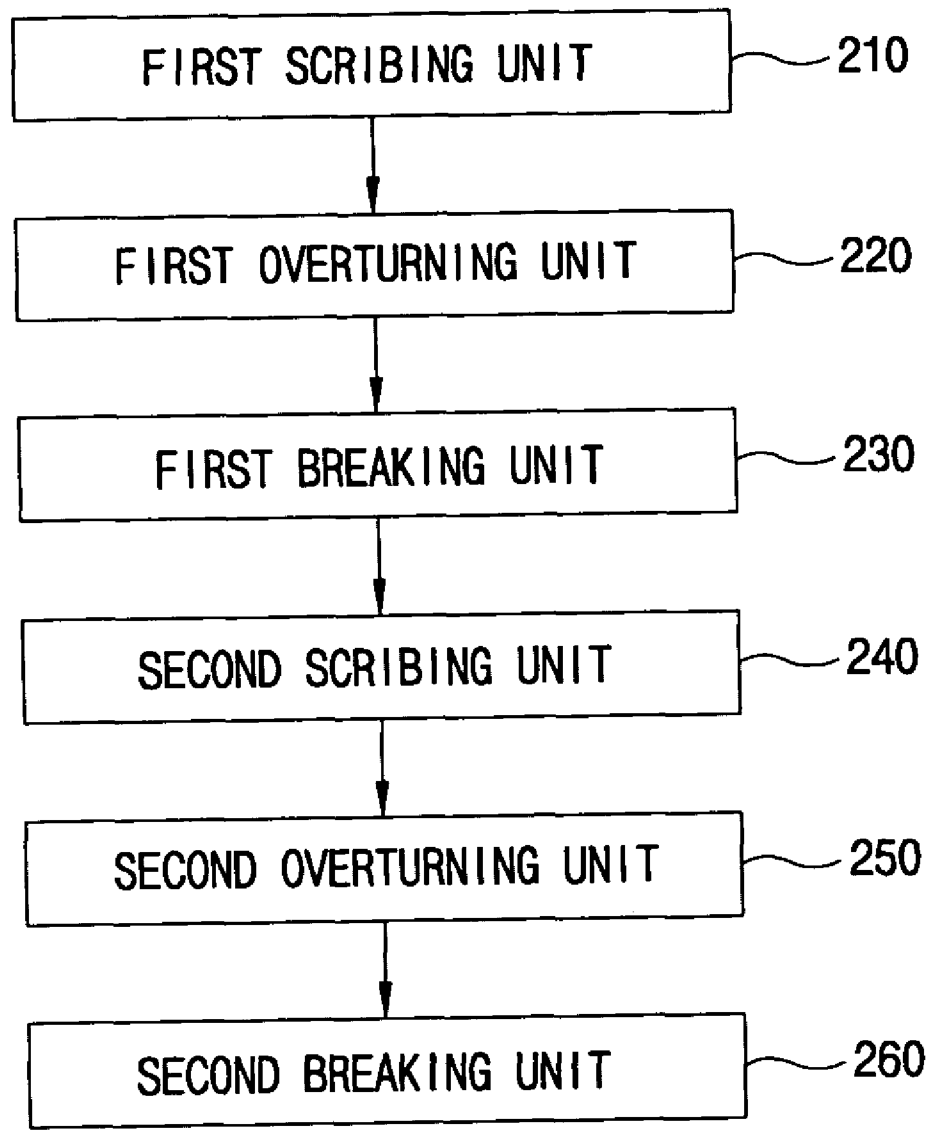
FIG. 5 is a schematic block diagram of an apparatus for cutting a liquid crystal display panel in accordance with the present invention.

FIG. 5 is a schematic block diagram of an apparatus for cutting a liquid crystal display panel in accordance with the present invention.

As illustrated, the apparatus for cutting a liquid crystal display panel comprises a first scribing unit 210 for forming first scribing lines. The first scribing lines divide a plurality of LCD panels in a first direction on a mother substrate where a plurality of LCD panels are formed. As used herein, mother substrate refers to the substrate upon which LCD panels are formed. The first scribing unit also rotates the mother substrate and forms second scribing lines which divide the plurality of LCD panels in a second direction on the mother substrate.

The apparatus for cutting a liquid crystal display panel also includes a first flipping unit 220 for flipping the mother substrate and a first breaking unit 230. The first breaking unit 230 includes a breaking bar for striking the flipped mother substrate along the first scribing lines in the first direction so that a crack forms on the mother substrate. The breaking unit 230 also has a plurality of breaking rollers for pressing the flipped mother substrate along the second scribing lines in the second direction so that a crack forms on the mother substrate.

Additionally, the apparatus for cutting a liquid crystal display panel comprises a second scribing unit 240 for forming third scribing lines that divide the plurality of LCD panels in the first direction on the flipped mother substrate. The second scribing unit also rotates the mother substrate and forms fourth scribing lines that divide the LCD panels in the second direction on the mother substrate.

The apparatus for cutting a liquid crystal display panel also has a second flipping unit 250 for re-flipping the flipped mother substrate. The apparatus also includes a second breaking unit 260 having a breaking bar for striking the flipped mother substrate along the third scribing lines so that a crack is formed on the mother substrate. The second breaking unit 260 has a plurality of breaking rollers which press the flipped mother substrate along the fourth scribing lines so that a crack is formed on the mother substrate.

Hereinafter, a method for cutting a liquid crystal display panel by the apparatus for cutting a liquid crystal display panel discussed with reference to FIG. 5 will be explained with reference to FIGS. 6A to 6H.

FIGS. 6A to 6H sequentially show a method for cutting a liquid crystal display panel using the apparatus for cutting a liquid crystal display panel of FIG. 5 in accordance with the present invention.

Figure 6A:
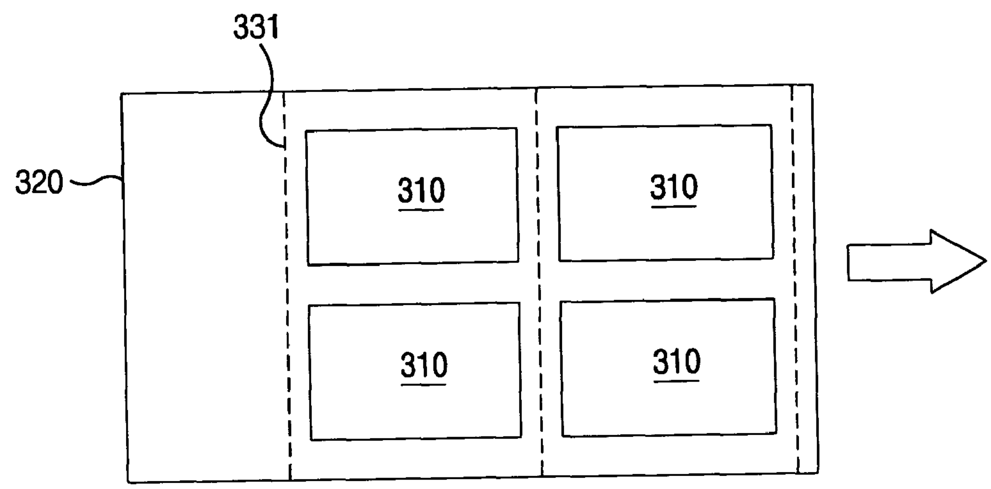
FIGS. 6A to 6H sequentially illustrate a method for cutting a liquid crystal display panel by the apparatus for cutting a liquid crystal display panel of FIG. 5 in accordance with the present invention.

As illustrated in FIG. 6A, the first scribing unit 210 of FIG. 5 moves a mother substrate 320 having a plurality of LCD panels 310 formed thereon in one direction. The first scribing unit 210 sequentially forms first scribing lines 331 which divide the plurality of LCD panels 310 in a first direction.

Figure 6B:
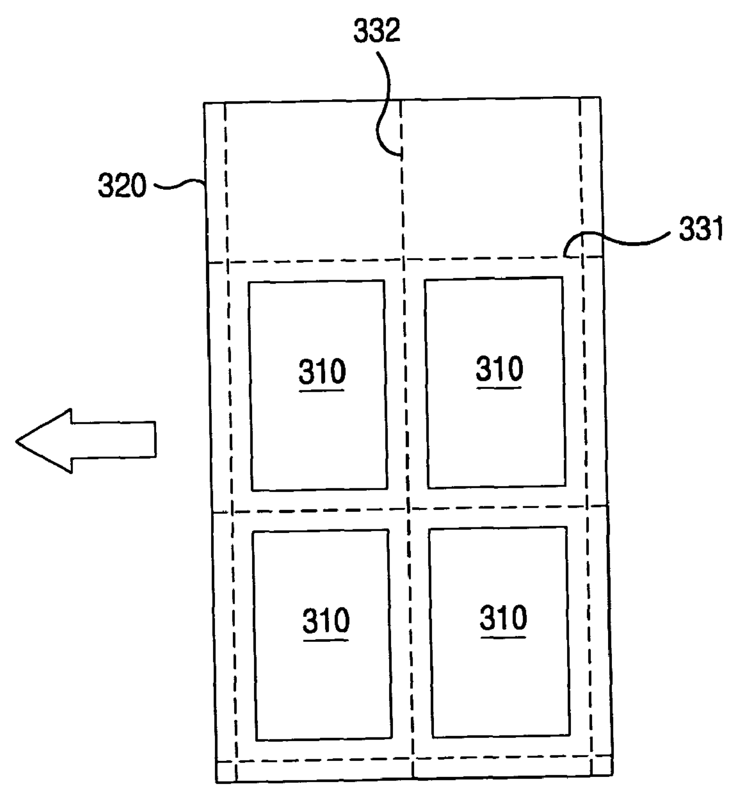

As illustrated in FIG. 6B, the mother substrate 320 rotates by 90° and then moves back to its original position. As the mother substrate 320 moves back to its original position, second scribing lines 332, which divide the plurality of LCD panels 310 in a second direction, are sequentially formed.

Figure 6C:
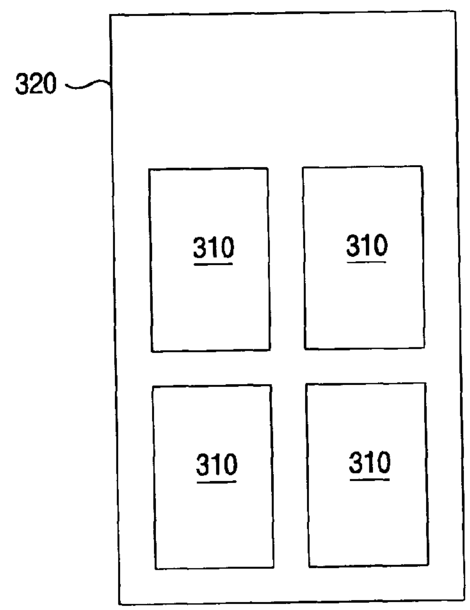

As illustrated in FIG. 6C, the first flipping unit 220 of FIG. 5 flips the mother substrate 320.

Figure 6D:
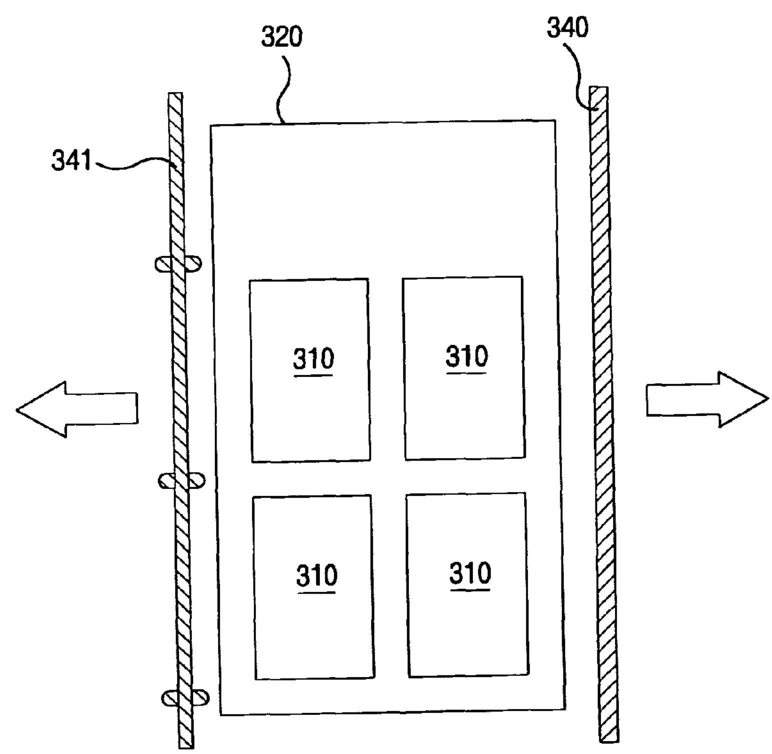

As illustrated in FIG. 6D, the first breaking unit 230 moves the mother substrate 320 in a direction as illustrated in FIG. 6D and strikes the mother substrate 320 with a breaking bar 340 thereby forming a crack along the first scribing lines 331. Also, the first breaking unit 230 moves the mother substrate 320 to its original position as shown and presses the mother substrate 320 with a plurality of breaking rollers 341. When the plurality of breaking rollers 341 are pressed against mother substrate 320, a crack is formed along the second scribing lines 332.

Figure 6E:
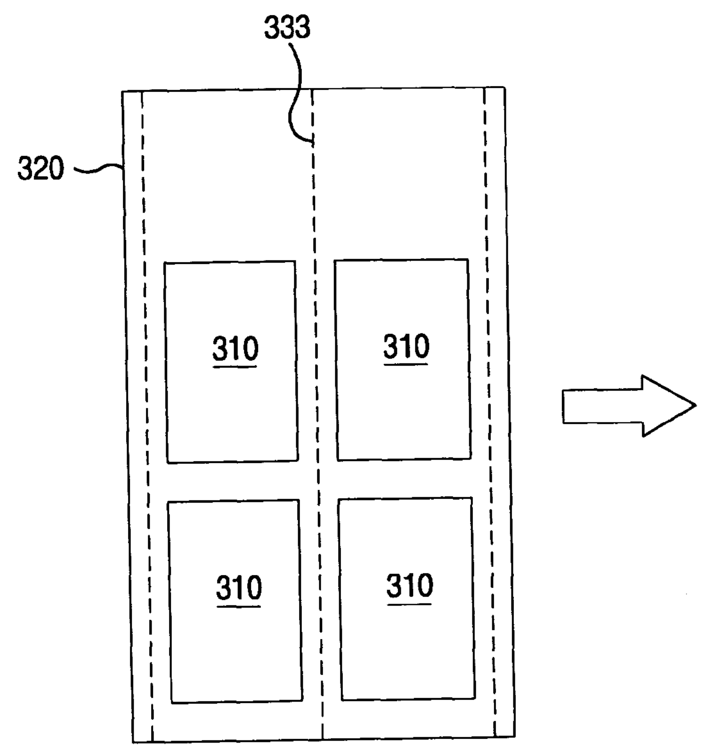

As illustrated in FIG. 6E, the second scribing unit 240 moves the flipped mother substrate 320 in one direction, and sequentially forms third scribing lines 333 which divide the plurality of LCD panels 310 in the first direction.

Figure 6F:
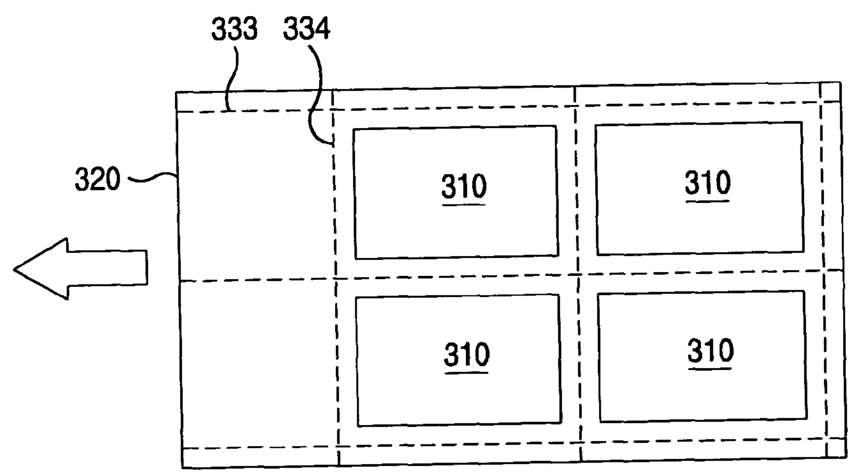

As illustrated in FIG. 6F, the mother substrate 320 rotates 90° and then moves to its original position. As the mother substrate 320 moves back to its original position, fourth scribing lines 334 which divide the plurality of LCD panels 310 in the second direction are sequentially formed.

Figure 6G:
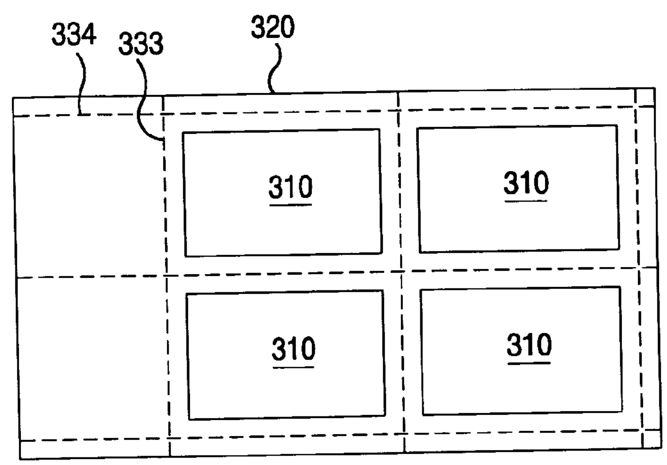

As illustrated in FIG. 6G, the second flipping unit 250 re-flips the mother substrate 320.

Figure 6H:
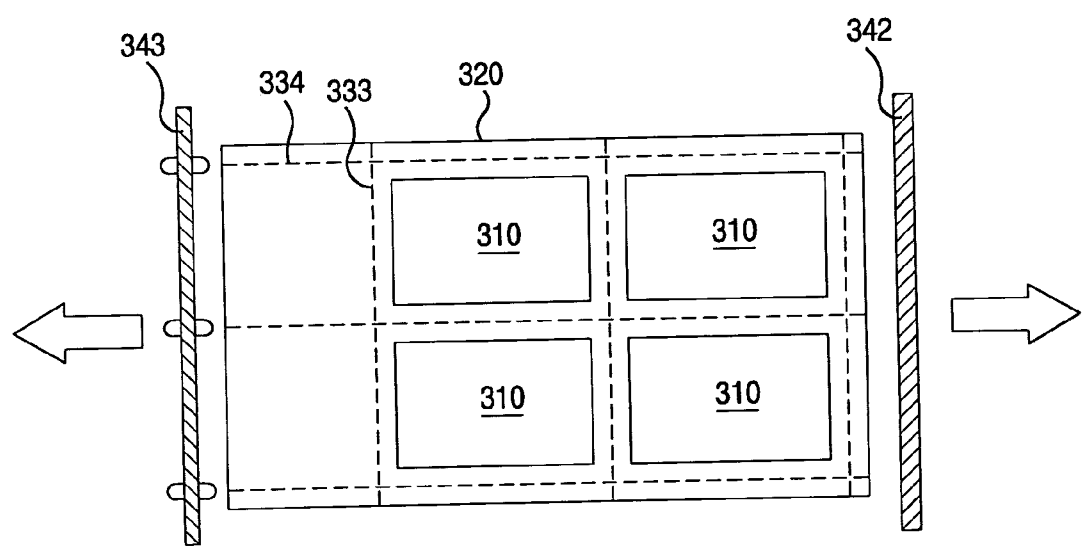

As illustrated in FIG. 6H, the second breaking unit 260 moves the mother substrate 320 in a direction as shown and strikes the mother substrate 320 with a breaking bar 342. When the mother substrate is struck, a crack is formed along the third scribing lines 333. Also, the second breaking unit 260 moves the mother substrate 320 to its original position as shown and presses the mother substrate 320 with a plurality of breaking rollers 343. When the plurality of breaking rollers 343 press the mother substrate 320, a crack is formed along the fourth scribing lines 334.

As mentioned above, in the apparatus and method for cutting a liquid crystal display panel according to the present invention, the mother substrate does not have to rotate during a breaking process. Therefore, a scribing process is performed four times and a breaking process is performed four times during two rotation processes and two flipping processes.

Thus, two scribing units including a rotating unit and two breaking units having a flipping unit may be used. The present invention minimizes installation space required in a fabrication line. Thus, the present invention decreases both costs associated with installation and space requirements.

In addition, the present invention reduces times required for breaking processes thereby increasing productivity. Furthermore, the present invention simplifies a breaking process of LCD panels having different sizes fabricated on a mother substrate.

Hereinafter, in accordance with a further embodiment, a method for cutting a liquid crystal display panel and an apparatus thereof will be explained with reference to FIGS. 7A to 7J.

FIGS. 7A to 7J sequentially illustrate a method for cutting a liquid crystal display panel with the apparatus for cutting a liquid crystal display panel described with reference to FIG. 5 where LCD panels having different sizes are fabricated on a mother substrate.

Figure 7A:
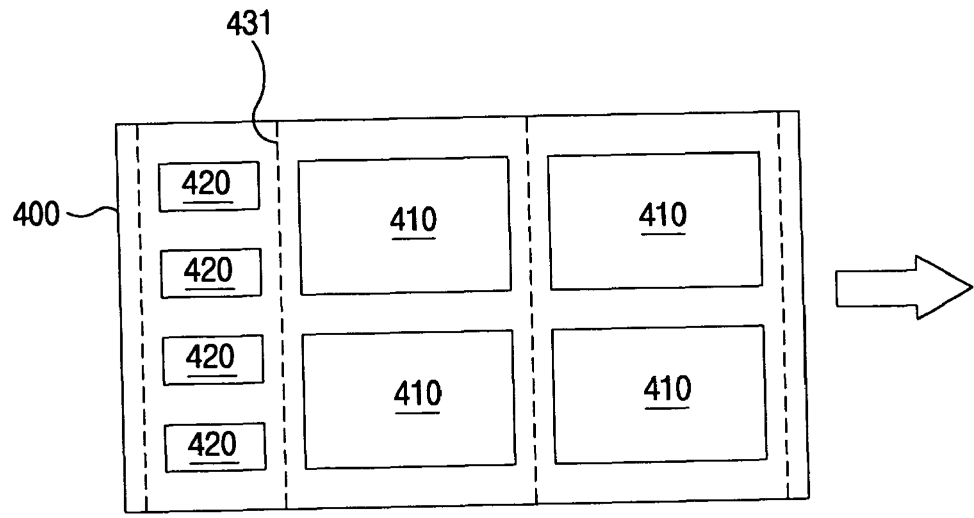
FIGS. 7A to 7J sequentially illustrate a method for cutting a liquid crystal display panel by the apparatus for cutting a liquid crystal display panel of FIG. 5 where LCD panels having different sizes are fabricated on one mother substrate in accordance with the present invention.

As illustrated in FIG. 7A, a mother substrate 400 has a plurality of LCD panels 410 of a first size and LCD panels 420 of a second size formed in a direction as illustrated in the figure. As the first scribing unit 210 discussed with reference to FIG. 5 moves the mother substrate 400, first scribing lines 431 that divide the plurality of LCD panels 410 of a first size and the LCD panels 420 of a second size in a first direction are sequentially formed.

Figure 7B:
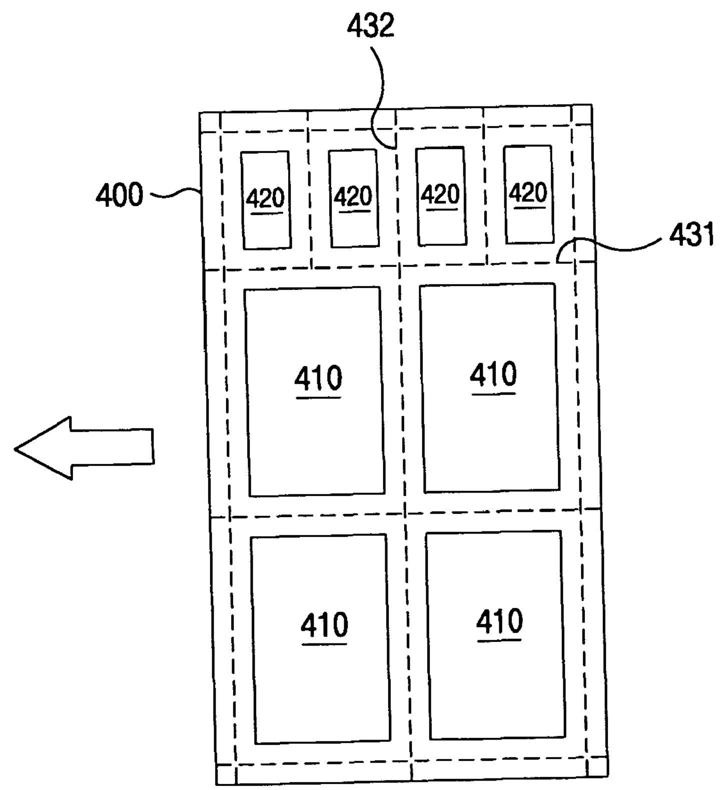

As illustrated in FIG. 7B, the mother substrate 400 rotates 90° and then moves back to its original position. As the mother substrate 400 moves back to its original position, second scribing lines 432 which divide the plurality of LCD panels 410 of a first size and the LCD panels 420 of a second size in a second direction are sequentially formed.

Figure 7C:
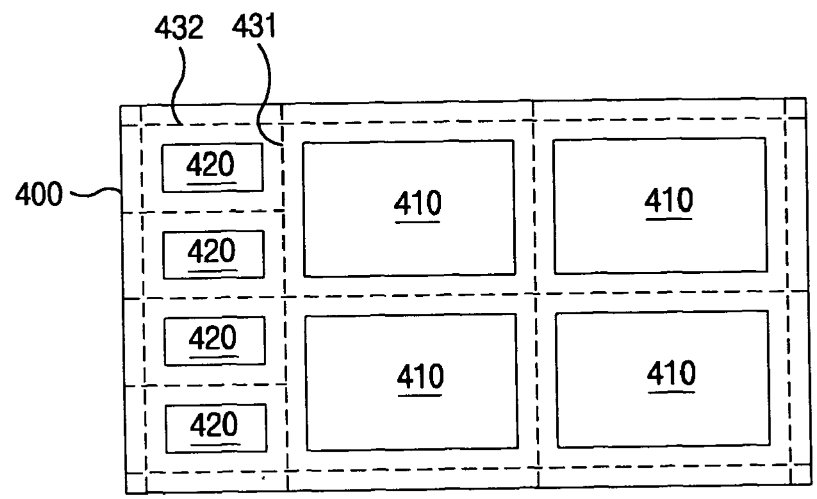

As illustrated in FIG. 7C, the mother substrate 400 rotates by 90°.

Figure 7D:
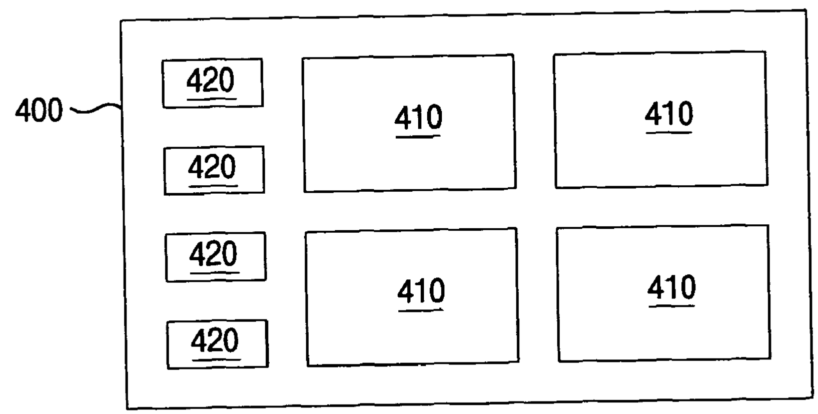

As illustrated in FIG. 7D, the first flipping unit 220 flips the mother substrate 400.

Figure 7E:
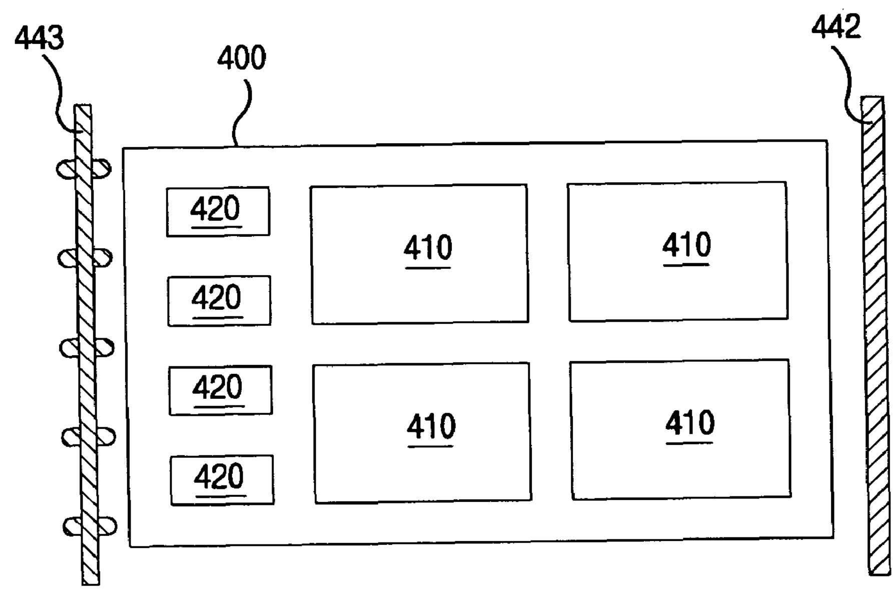

As illustrated in FIG. 7E, the first breaking unit 230 moves the mother substrate 400 in one direction and strikes the mother substrate 400 with a breaking bar 442. When the mother substrate is struck, a crack forms along the first scribing lines 431. Also, the first breaking unit 230 moves the mother substrate 400 to its original position and presses the mother substrate 400 with a plurality of breaking rollers 443. Cracks form along the second scribing lines 432 when the plurality of breaking rollers are pressed against the mother substrate 400.

In accordance with an embodiment, the plurality of breaking rollers 443 may selectively apply a pressure up to a desired position of the mother substrate 400. For example, where the second scribing lines 432, which divide the LCD panels of a second size in a second direction, are identical to the second scribing lines 432, which divide the LCD panels 410 of a first size in the second direction, the plurality of breaking rollers 443 applies the same pressure from one end of the mother substrate 400 to another end of the mother substrate. As such, a crack forms along the second scribing lines 432. Alternatively, where the second scribing lines 432, which divide the LCD panels of a second size in a second direction, extend to image display regions of the LCD panels 410 of a first size, the plurality of breaking rollers 443 applies the same pressure from one end of the mother substrate 400 to the first scribing lines 431, which divide the LCD panels 410 of a first size in a first direction. Thus, a crack forms along the first scribing lines 431.

Accordingly, where the LCD panels 410 of a first size and the LCD panels 420 of a second size are formed on the mother substrate 400, a breaking process can be performed without damaging image display regions of the LCD panels 410 of a first size and the LCD panels 420 of a second size.

In an embodiment, a plurality of the breaking rollers 443 may be provided such that the plurality of breaking rollers corresponds to the second scribing lines 431, which divide the LCD panels 410 of a first size and the LCD panels 420 of a second size in a second direction. Also, the plurality of breaking rollers 443 may be fabricated to control a spacing interval therebetween such that the plurality of breaking rollers 443 may be applied to various models of an LCD panel.

Figure 7F:
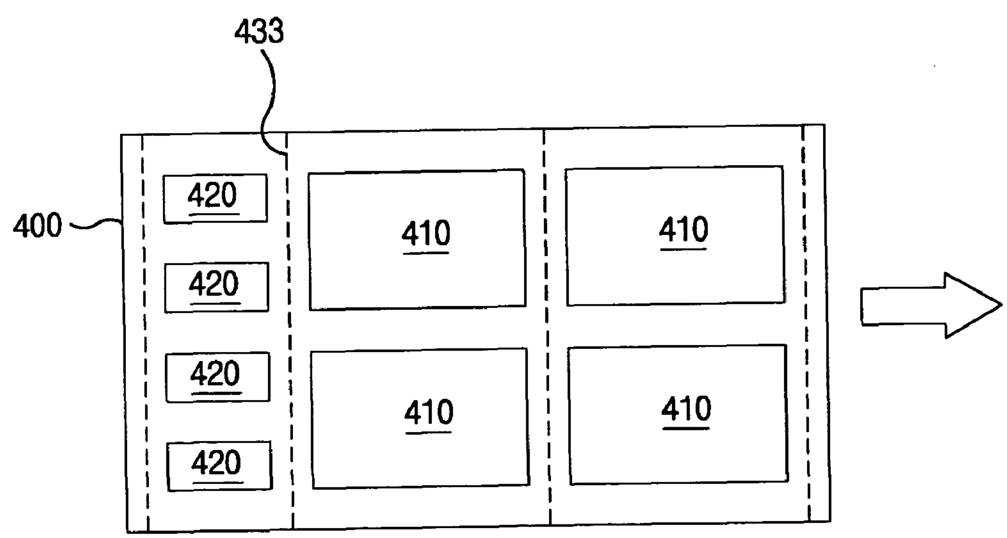

As illustrated in FIG. 7F, the second scribing unit 240 moves the flipped mother substrate 400 in one direction. As the second scribing unit 240 moves the mother substrate 400, third scribing lines 433, which divide the plurality of LCD panels 410 of a first size and the LCD panels 420 of a second size in a first direction, are sequentially formed.

Figure 7G:
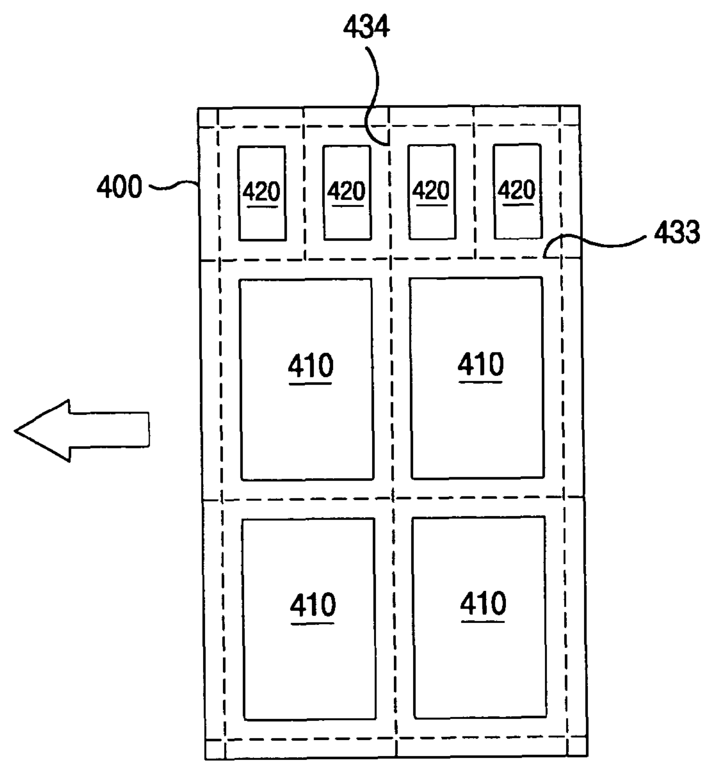

As illustrated in FIG. 7G, the mother substrate 400 rotates 90° and moves back to its original position. As the mother substrate 400 moves back to its original position, fourth scribing lines 434, which divide the plurality of LCD panels 410 of a first size and the LCD panels 420 of a second size in a second direction, are sequentially formed.

Figure 7H:
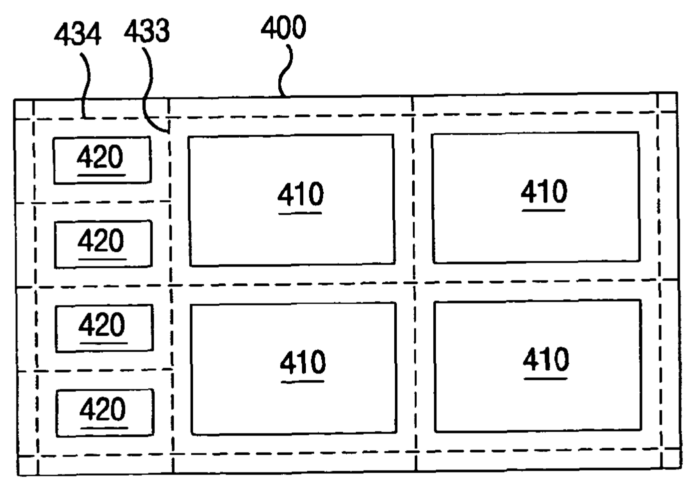

As illustrated in FIG. 7H, the mother substrate 400 again rotates 90°.

Figure 7I:
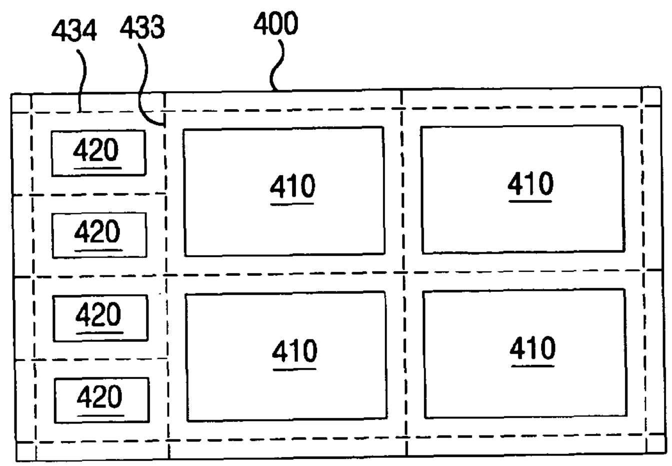

As illustrated in FIG. 7I, the second flipping unit 250 re-flips the mother substrate 400.

Figure 7J:
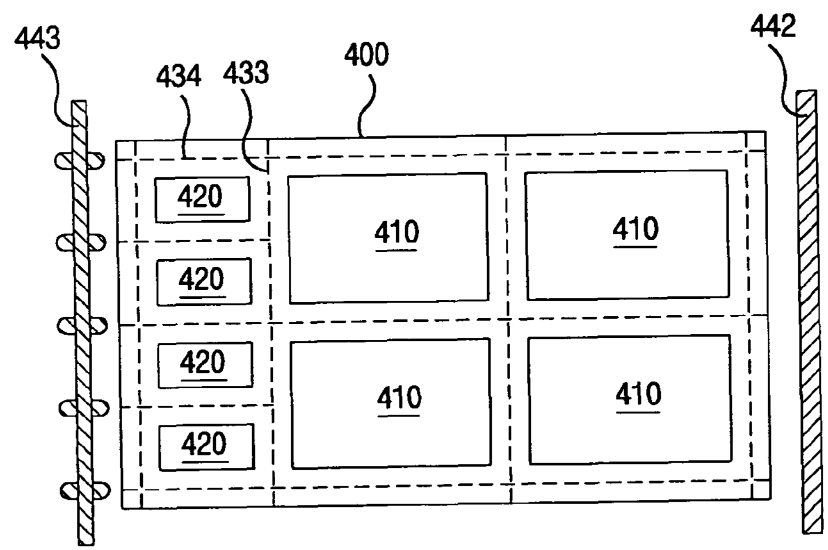

As illustrated in FIG. 7J, the second breaking unit 260 moves the mother substrate 400 in one direction and strikes the mother substrate 400 with a breaking bar 442. When the breaking bar 442 strikes the mother substrate, a crack forms along the third scribing lines 433. Also, the second breaking unit 260 moves the mother substrate 400 to its original position and presses the mother substrate 400 with the plurality of breaking rollers 443. When the plurality of breaking rollers 443 press against the mother substrate 400, a crack forms along the fourth scribing lines 434.

In an embodiment, the plurality of breaking rollers 443 can selectively apply a pressure up to a desired position of the mother substrate 400. To further illustrate, when the fourth scribing lines 434, which divide the LCD panels 420 of a second size in a second direction, are similar to the fourth scribing lines 434, which divide the LCD panels 410 of a first size in a second direction, the plurality of breaking rollers 443 apply the same pressure from one end of the mother substrate 400 to another end, thereby forming a crack along the fourth scribing lines 434. Alternatively, where the fourth scribing lines 434, which divide the LCD panels 420 of a second size in a second direction, extend to image display regions of the LCD panels 410 of a first size, the plurality of breaking rollers 443 apply the same pressure from one end of the mother substrate 400 to the third scribing lines 433, which divide the LCD panels 410 of a first size in a first direction. Thus, a crack forms along the fourth scribing lines 434.

Therefore, where the LCD panels 410 of a first size and the LCD panels 420 of a second size are formed on the mother substrate 400, a breaking process can be performed without damaging image display regions of the LCD panels 410 of a first size and the LCD panels 420 of a second size.

In an embodiment, a plurality of the breaking rollers 443 may be provided such that the plurality of breaking rollers corresponds to the fourth scribing lines 434, which divide the LCD panels 410 of a first size and the LCD panels 420 of a second size in a second direction. Also, the plurality of breaking rollers 443 may be fabricated to control an interval therebetween such that the plurality of breaking rollers 443 may be applied to various models of an LCD panel.

In the apparatus and method for cutting a liquid crystal display panel according to the present invention, a breaking process may be performed without damaging image display regions of LCD panels where LCD panels having different sizes are fabricated on a mother substrate.

Figure 8:
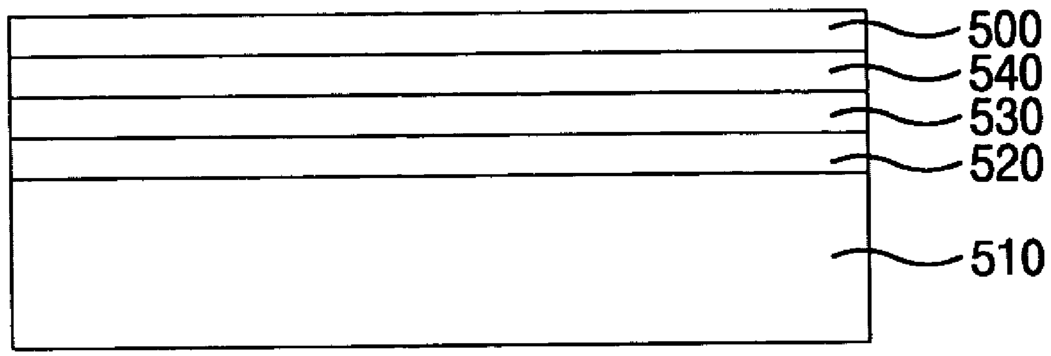
FIG. 8 is an exemplary view illustrate a section of a table on which a mother substrate is loaded at first and second breaking units of FIG. 5.

FIG. 8 illustrates a section of a table on which a mother substrate is loaded at the first and second breaking units 230 and 260 of FIG. 5. As illustrated, an impact absorption layer 520, a surface planarization layer 530, and an electrostatic preventing layer 540 are stacked on a base 510. A mother substrate 500 is loaded on the electrostatic preventing layer 540.

The impact absorption layer 520 may be formed of natural urethane. Also, as a material of the surface planarization layer 530, a stainless steel may be applied. The electrostatic preventing layer 540 may be formed of a Teflon tape.

In the present invention, an embodiment where four LCD panels of a first size and four LCD panels of a second size are fabricated on a mother substrate was explained. However, the present invention contemplates the use of any number of both LCD panels and sizes.

In the apparatus and method for cutting a liquid crystal display panel, it is not required to rotate the mother substrate at the time of performing a breaking process. Therefore, a scribing process is performed four times and a breaking process is performed four times through two rotation processes and two flipping processes.

Thus, the present invention includes two scribing units having a rotating unit and two breaking unitshaving a flipping unit. Thus, equipment utilizing the present invention minimize installation space in a fabrication line. Accordingly, expenses associated with installation of the equipment and space occupied by the equipment are decreased.

In addition, the present invention reduces the time required for a breaking process, thereby increasing productivity.

Furthermore, the cutting apparatus and method of the present invention allows for a breaking process which does not damage image display regions of LCD panels where LCD panels having different sizes are fabricated on a mother substrate.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An apparatus for cutting a liquid crystal display panel, comprising:

a table on which a mother substrate is loaded, wherein the table includes an impact absorption layer, a surface planarization layer, and an electrostatic preventing layer that are sequentially stacked on a base;

a scribing unit for forming first scribing lines in a first direction and second scribing lines in a second direction for dividing LCD panels on the mother substrate where a plurality of LCD panels are formed;

a flipping unit for flipping the mother substrate; and a breaking unit having a breaking bar for striking portions of the flipped mother substrate corresponding to the first scribing lines to form a first crack on the first scribing lines, and having a plurality of breaking rollers for pressing portions of the flipped mother substrate corresponding to the second scribing lines to form a second crack on the second scribing lines, wherein a pressure applying position of each breaking roller is individually adjustable in accordance with different sizes of the LCD panels on the mother substrate, wherein the portions of the flipped mother substrate struck by the breaking bar are different from the portions of the flipped mother substrate pressed by the breaking rollers, wherein each roller is independently movable vertically with respect to the mother substrate such that during a cutting operation, each individual roller moves up or down between pressure applying and non-pressure applying positions such that only the portions of the mother substrate with the second scribing lines are contacted by the rollers.

2. The apparatus of claim 1, wherein the impact absorption layer includes natural urethane.

3. The apparatus of claim 1, wherein the surface planarization layer includes stainless steel.

4. The apparatus of claim 1, wherein the electrostatic preventing layer includes a Teflon tape.

5. An apparatus for cutting an LCD panel, comprising:

a table on which a mother substrate is loaded, wherein the table includes an impact absorption layer, a surface planarization layer, and an electrostatic preventing layer that are sequentially stacked on a base;

a first scribing unit for forming first scribing lines in a first direction and second scribing lines in a second direction for dividing LCD panels on the mother substrate where a plurality of LCD panels are formed;

a first flipping unit for flipping and a second flipping unit for re-flipping the mother substrate;

a first breaking unit having a breaking bar for striking portions of the mother substrate corresponding to the first scribing lines flipped by the first flipping unit to form a first crack on the first scribing lines, and having a plurality of first breaking rollers for pressing portions of the flipped mother substrate corresponding to the second scribing lines to form a second crack on the second scribing lines, wherein a pressure applying position of each breaking roller of the plurality of first breaking rollers is individually adjustable in accordance with different sizes of the LCD panels on the mother substrate, wherein the portions of the flipped mother substrate corresponding to the first scribing lines struck by the breaking bar are different from the portions of the flipped mother substrate corresponding to the second scribing lines pressed by the first breaking rollers;

a second scribing unit for forming third scribing lines in the first direction and fourth scribing lines in the second direction for dividing LCD panels on the flipped mother substrate, wherein the third scribing lines corresponds to the first scribing lines, and the fourth scribing lines corresponds to the second scribing lines; and a second breaking unit having a second breaking bar for striking portions of the mother substrate corresponding to the third scribing lines re-flipped by the second flipping unit to form a third crack on the third scribing lines, and having a plurality of second breaking rollers for pressing portions of the re-flipped mother substrate corresponding to the fourth scribing lines to form a fourth crack on the fourth scribing lines, wherein the portions of the third scribing lines on the re-flipped mother substrate struck by the second breaking bar are different from the portions of the re-flipped mother substrate pressed by the second breaking rollers wherein each roller of the plurality of first breaking rollers is independently movable vertically with respect to the mother substrate such that during a cutting operation, each individual roller of the plurality of first breaking rollers moves up or down between pressure applying and non-pressure applying positions such that only the portions of the mother substrate with the second scribing lines are contacted by the first breaking rollers.

6. The apparatus of claim 5, wherein the impact absorption layer includes natural urethane.

7. The apparatus of claim 5, wherein the surface planarization layer includes stainless steel.

8. The apparatus of claim 5, wherein the electrostatic preventing layer includes a Teflon tape.

* * * * *